US008884821B2

(12) United States Patent
DeCabooter et al.

(10) Patent No.: US 8,884,821 B2
(45) Date of Patent: Nov. 11, 2014

(54) APPARATUS AND METHOD FOR DETERMINING VEHICLE LOCATION

(75) Inventors: Steve DeCabooter, Middleton, WI (US); James Snider, Kildeer, IL (US); Robert F. D'Avello, Lake Zurich, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 12/643,412

(22) Filed: Dec. 21, 2009

(65) Prior Publication Data

US 2011/0148712 A1    Jun. 23, 2011

(51) Int. Cl.
*B60R 25/00* (2013.01)
*H04K 3/00* (2006.01)
*B60R 25/102* (2013.01)
*B60R 25/20* (2013.01)
*B60R 25/33* (2013.01)

(52) U.S. Cl.
CPC ............. *B60R 25/33* (2013.01); *H04K 3/255* (2013.01); *H04K 3/88* (2013.01); *B60R 25/1025* (2013.01); *H04K 2203/22* (2013.01); *B60R 25/2072* (2013.01); *B60R 2325/205* (2013.01); *H04K 3/22* (2013.01); *H04K 2203/16* (2013.01)
USPC ...... 342/450; 342/357.54; 342/457; 342/463; 342/465; 340/426.19; 340/426.2; 340/426.22; 701/468; 701/469; 701/474; 701/484; 701/485; 701/519

(58) Field of Classification Search
CPC .... B60R 25/33; B60R 25/102; B60R 25/104; B60R 25/1025; B60R 25/2072; B60R 25/30; B60R 2325/00; B60R 2325/10; B60R 2325/105; B60R 2325/20; B60R 2325/30; B60R 2325/302; B60R 2325/304; B60R 2325/306; B60R 2325/308; G01S 5/0009; G01S 5/0036; G01S 5/0045; G01S 5/0054; G01S 19/09; G01S 19/16; G01S 19/21; G01S 19/256; G01S 19/42; G01S 1/00; G01S 1/02

USPC ............... 342/357.54, 457, 463, 465, 450; 340/426.19, 426.2, 426.22; 701/468, 701/469, 474, 484, 485, 519
See application file for complete search history.

(56) References Cited

U.S. PATENT DOCUMENTS 5,515,419 A * 5/1996 Sheffer ................. 455/456.5
5,596,330 A * 1/1997 Yokev et al. ............... 342/387
(Continued)

FOREIGN PATENT DOCUMENTS

DE         10009488 A1    11/2000
DE    102004048668 A1     4/2006
(Continued)

OTHER PUBLICATIONS

International Search Report dated Apr. 18, 2011, from corresponding International Patent Application No. PCT/US1010/060773.
(Continued)

*Primary Examiner* — Jack W Keith
*Assistant Examiner* — Chuong P Nguyen (57) ABSTRACT

Communications are established and conducted between a communication and jamming detection at a vehicle and a base station. At the communication and jamming detection device, a determination is made as to when jamming of the communications between the communication and jamming detection device and the base station is occurring. When jamming is determined to be occurring, at least one location determination signal is transmitted from the communication and jamming detection device to at least one external tracking device. At the at least one external location determination device, the at least one location determination signal is received from the communication and jamming detection device. The location of the communication and jamming detection device at the vehicle is determined from the at least one location determination signal.

12 Claims, 4 Drawing Sheets

(56) References Cited

U.S. PATENT DOCUMENTS

| | | | |
|---|---|---|---|
| 5,895,436 | A | 4/1999 | Savoie et al. |
| 6,330,438 | B1 | 12/2001 | McClelland et al. |
| 6,774,845 | B2 * | 8/2004 | De Champlain .............. 342/374 |
| 6,803,861 | B2 | 10/2004 | Flick |
| 7,049,942 | B2 * | 5/2006 | Gallovich .................. 340/426.1 |
| 7,091,835 | B2 * | 8/2006 | Boulay et al. ............. 340/426.19 |
| 7,286,040 | B2 * | 10/2007 | Karabinis .................... 340/10.1 |
| 7,443,286 | B2 * | 10/2008 | Nakane et al. ........... 340/426.18 |
| 7,536,169 | B2 * | 5/2009 | Duvall ....................... 455/404.1 |
| 7,825,780 | B2 * | 11/2010 | Pitt .......................... 340/426.18 |
| 2002/0014978 | A1 | 2/2002 | Flick |
| 2002/0163906 | A1 | 11/2002 | Diachina et al. |
| 2003/0222813 | A1 * | 12/2003 | Boulay et al. ................. 342/159 |
| 2004/0005858 | A1 | 1/2004 | Cervinka et al. |
| 2004/0075539 | A1 * | 4/2004 | Savoie et al. ............. 340/426.1 |
| 2004/0139470 | A1 * | 7/2004 | Treharne ...................... 725/105 |
| 2005/0090952 | A1 | 4/2005 | Boulay et al. |
| 2006/0007039 | A1 | 1/2006 | Duvall |
| 2006/0267744 | A1 | 11/2006 | Baumgartner et al. |
| 2007/0049323 | A1 | 3/2007 | Wang et al. |
| 2007/0079376 | A1 | 4/2007 | Jean-Marc et al. |
| 2007/0200688 | A1 | 8/2007 | Tang et al. |
| 2008/0186932 | A1 | 8/2008 | Do et al. |
| 2010/0201829 | A1 * | 8/2010 | Skoskiewicz et al. ...... 348/211.2 |
| 2010/0222002 | A1 * | 9/2010 | Lys .............................. 455/63.1 |

FOREIGN PATENT DOCUMENTS

| | | | |
|---|---|---|---|
| EP | 0167442 | A2 | 1/1986 |
| EP | 1362753 | A1 | 11/2003 |
| EP | 1514444 | A1 | 3/2005 |
| EP | 1593564 | A1 | 11/2005 |
| EP | 1809057 | A1 | 7/2007 |
| EP | 2003818 | A1 | 12/2008 |
| EP | 2124428 | A1 | 11/2009 |
| GB | 2296843 | A | 7/1996 |
| GB | 2317418 | A | 3/1998 |
| GB | 2407455 | A | 4/2005 |
| GB | 2435987 | A | 9/2007 |
| GB | 2445046 | A | 6/2008 |
| GB | 2457102 | A | 8/2009 |
| WO | 95/33214 | A1 | 12/1995 |
| WO | 96/04155 | A1 | 2/1996 |
| WO | 00/21053 | A1 | 4/2000 |
| WO | 01/32481 | A1 | 5/2001 |
| WO | WO01/31797 | A1 | 5/2001 |
| WO | 03/103322 | A1 | 12/2003 |
| WO | 2005/112321 | A1 | 11/2005 |
| WO | 2006/092737 | A2 | 9/2006 |
| WO | 2007/019814 | A1 | 2/2007 |
| WO | WO 2007080190 | A1 * | 7/2007 |
| WO | 2008/111001 | A2 | 9/2008 |

OTHER PUBLICATIONS

International Search Report dated May 24, 2011, from corresponding International Patent Application No. PCT/US2010/060518.

International Search Report dated Jun. 17, 2011, from corresponding International Patent Application No. PCT/US2010/060787.

International Search Report dated Mar. 28, 2011, from corresponding International Patent Application No. PCT/US2010/060803.

M. Mouly; M-B Pautet, "Mobility and Security Management" GSM System for Mobile Communications, Jan. 1, 1993, pp. 432-498, Europe Media, Lassay-Les-Chateaux, France.

International Search Report dated Apr. 12, 2011, from corresponding International Patent Application No. PCT/US2010/060760.

International Search Report dated Mar. 10, 2011, from corresponding International Patent Application No. PCT/US2010/060811.

International Search Report dated Mar. 1, 2011, from corresponding International Patent Application No. PCT/US2010/060750.

International Search Report dated Feb. 28, 2011, from corresponding International Patent Application No. PCT/US2010/060532.

International Search Report dated Mar. 1, 2011, from corresponding International Patent Application No. PCT/US2010/060527.

International Search Report dated Jun. 28, 2011, from corresponding International Patent Application No. PCT/US2010/060795.

International Search Report dated May 13, 2011, from corresponding International Patent Application No. PCT/US2010/060675.

International Search Report dated Jun. 2011, from corresponding International Patent Application No. PCT/US2010/060723.

* cited by examiner

APPARATUS AND METHOD FOR DETERMINING VEHICLE LOCATION

CROSS REFERENCES TO RELATED APPLICATIONS

"Apparatus and Method of Detecting Jamming of Communications" having application Ser. No. 12/643,049, issued as U.S. Pat. No. 8,319,615, on Nov. 27, 2012, to Snider et al.
"Apparatus and Method for Broadcasting the Detection of RF Jammer Presence" having application Ser. No. 12/643,825, issued as U.S. Pat. No. 8,320,872, on Nov. 27, 2012, to Snider.
"Apparatus and Method for Compromised Vehicle Tracking" having application Ser. No. 12/643,498, by Snider et al., published on Jun. 23, 2011, with Publication No. 2011/0148610.
"Apparatus and Method for Detecting a Cloned Base Station" having application Ser. No. 12/643,081, by Snider et al., published on Jun. 23, 2011, with Publication No. 2011/0151833.
"Apparatus and Method for detecting Communication Interference" having application Ser. No. 12/643,068, issued as U.S. Pat. No. 8,611,847, on Dec. 17, 2013, to Snider et al.
"Apparatus and Method for Detecting a Cloned Base Station" having application Ser. No. 12/643,353, issued as U.S. Pat. No. 8,639,209 on Jan. 28, 2014, to Walby et al.
"Apparatus and Method for Determining an Invalid Base Station" having application Ser. No. 12/643,463, by Dabholkar et al., published on Jun. 23, 2011, with Publication No. 2011/0151834.
"Apparatus and Method for Maintaining Communication with a Stolen Vehicle Tracking Device" having application Ser. No. 12/643,841 issued on Apr. 17, 2012, as U.S. Pat. No. 8,159,336 to Snider et al.
"Apparatus and Method for Reducing False Alarms in Stolen Vehicle Tracking" having application Ser. No. 12/643,889, by Dabholkar et al., published Jun. 23, 2011, with Publication No. 2011/0148609.
"Apparatus and Method for Tracking Stolen Vehicles" having application Ser. No. 12/643,862, by D'Avello, published Jun. 23, 2011, with Publication No. 2011/0148713.
"Apparatus and Method for Maintaining Communications with a Vehicle in the Presence of Jamming" having application Ser. No. 12/643,850, issued on May 8, 2012, as U.S. Pat. No. 8,175,573, to D'Avello et al.
all of which are being filed on the same date as the present application and all of which having their contents incorporated herein by reference in their entireties.

FIELD OF THE INVENTION

The field of the invention relates to vehicular communications and, more specifically to detecting the location of a vehicle when these communications are disrupted.

BACKGROUND

Vehicles are equipped with various types of communication systems that provide or facilitate various types of functions. For instance, a vehicle may be equipped with a global positioning satellite (GPS) system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications or devices attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle. When a SVT device can no longer receive communications, previous systems did not keep track of location of the device (and hence the vehicle) as it progressed or travelled across a network or networks. The only location known for the SVT device was its last known location before communications were lost. This situation led to many problems such as not being able to locate the vehicle if the vehicle is stolen.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where after jamming (or attempted jamming) is detected, vehicle location is determined so that appropriate actions can be taken. The approaches described herein are easy to use, accurate in determining the location of a vehicle after jamming or attempted jamming is detected, and cost effective to implement resulting in enhanced security for vehicles and their contents.

In many of these embodiments, communications are established and conducted between a communication and jamming detection device at a vehicle and a base station. At the communication and jamming detection device, a determination is made as to when jamming of the communications between the communication and jamming detection device and the base station is occurring. When jamming is determined to be occurring, at least one location determination signal is transmitted from the communication and jamming detection device to at least one external location determination device. At the external location determination device, the signals are received from the communication and jamming detection device. The location of the communication and jamming detection device at the vehicle is determined from the signals.

The signals can be transmitted from the communication and jamming detection device to the external location determination device over a number of different channel types or frequencies. For example, the signals may be transmitted on a plurality of control channels such as a random access channel (RACH) or the like. Other examples of control channels (and other channel or channel types) may also be used for transmissions.

The location determination device can receive information from any number of antennas and/or sensors. In one example, a signal is transmitted from the communication and jamming detection device and this signal is received at three antennas. The location determination device receives information from the three antennas (e.g., located at base stations). Each of the three signals has slightly different characteristics (e.g., each having slightly different time delay characteristic) such that the location determination apparatus triangulates the signals and thereby determines the location of the communication and jamming detection device. In still other examples, the power of the transmitted signals is used to determine the location of the communication and jamming detection device at the vehicle.

In other examples, the location is provided to at least one tracking device located in the vicinity of the vehicle. The tracking device can be any number of devices such as a camera located remotely from the vehicle and at least one sensing device at another vehicle. In still other examples, the tracking device may be a camera mounted on a building, bridge, or other structure such that the camera can view vehicles. Other examples of tracking devices and locations for disposing these devices are possible.

In other aspects, a security alert is transmitted to at least one security provider when jamming is detected. The security provider may be a private security company or the police to name two examples. The security provider using the determined location can take appropriate action to recover the vehicle.

In others of these embodiments, an apparatus for tracking the location of a vehicle includes an interface and a controller. The interface includes an input and an output and is configured to receive an indication that jamming is occurring with communications being conducted between a communication and jamming detection device at the vehicle and a base station. The controller is coupled to the interface and configured to determine the location of the communication and jamming detection from the indication and present the location at the output of the interface to a user (e.g., to an authorized security provider such as the police).

In some examples, the output of the interface couples to a presentation device. The presentation device may be any type of device that displays information and may include a visual display such as a video screen, a liquid crystal display, and/or one or more light emitting diodes to name a few examples. Audio information may also be presented. Other examples of displays are possible.

Figure 1:
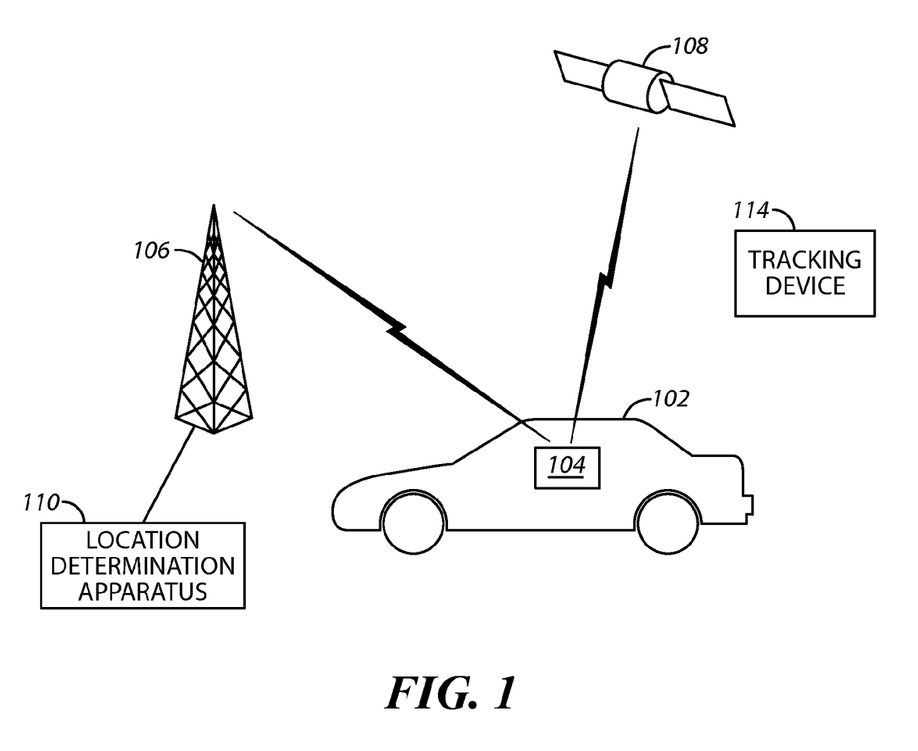
FIG. 1 comprises a block diagram of a system that determines vehicle location after jamming occurs according to various embodiments of the present invention.

Referring now to FIG. 1, one example of a system for tracking a vehicle having jammed communications is described. A vehicle 102 includes a communication and jamming detection device 104. The communication and jamming detection device 104 is disposed anywhere in or at the vehicle and communicates with a base station 106 and an external navigation system 108. The communication and jamming detection device 104 communicates with a location determination device 110 (e.g., over a cellular network infrastructure).

In the examples described herein, the approaches assume that the communication and jamming detection device 104 is at the vehicle 102. Hence, determining the location of the device 104 necessarily determines the location of the vehicle 102. Consequently, determining the location of the device 104 and the vehicle 102 are used interchangeably herein and it will be understood that reference to determining the location of one also refers to determining the location of the other.

The communication and jamming detection device 104 may be, in one example, a programmed electronic device that determines the location of the vehicle 102 from signals received from the navigation system 108. The location may be provided to the user to assist the user in navigating the vehicle or for SVT purposes. Alternatively, another separate device may be used to determine the location of the vehicle and this separate device may communicate with the communication and jamming detection device 104. The external navigation system 108 may be a GPS satellite or satellite system, in one example.

In addition, the device 104 determines if jamming and/or attempted jamming is occurring as to signals being received and/or being transmitted. The device 104 determines if signals received from the navigation system 108 and/or another network (e.g., a cellular network) are being jammed.

Many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, or even with individuals that are not within or associated with a vehicle.

The vehicle 102 may be any type of vehicle such as a car, truck, bus, airplane, ship, to name a few examples. The communication device 104 is any type of communication device that communicates with entities outside the vehicle 102 using any type of communication technology or protocol. For example, the communication device 104 may be or may incorporate a cellular phone, a transponder, a radio, or some combination of these or other devices.

The location determination device 110 is any single device (or alternatively multiple devices) that determines a vehicle location when jamming of vehicular communications is occurring. It may be any combination of hardware or software applications (e.g., a software program running at a general purpose computer). The location determination device 110 can itself include any number of separate devices and these separate devices may be separated over any geographical distance. The location determination device 110 is preferably disposed at a location separate and external (i.e., geographically separated) from the communication and jamming detection device 104. In this respect, the location determination device 110 may be disposed at a location of a service provider and the location determination device 110 may communicate with the vehicle 102 via the base station 106 (or some alternative communication arrangement).

In one example, the location determination device 110 receives three or more separate signals from three or more separate (e.g., geographically separated) antennas. In one aspect, the location determination device 110 determines the location of the communication and jamming detection device 104 by triangulating the signals, for instance, by comparing the time delays of each of the separate signals. Triangulation techniques are well known to those skilled in the art and will not be described in greater detail here. In still other examples, the power of the transmitted signals is used to determine the location of the communication and jamming detection device at the vehicle. Location determination approaches using the received power of signals are also well known to those skilled in the art and will not be described in greater detail here.

In one example of the operation of the system of FIG. 1, communications are established and conducted between the communication and jamming detection device 104 at the vehicle 102 and a base station 106. At the communication and jamming detection device 104, a determination is made as to when jamming (or attempted jamming) of the communications between the communication and jamming detection device 104 and the base station 106 is occurring. When jamming is determined to be occurring, at least one location determination signal is transmitted from the communication and jamming detection device 104 to the location determination device 110. At the at least one external location determination device 110, the signals are received from the communication and jamming detection device 104. The location of the communication and jamming detection device 104 (and the vehicle 102 since the device 104 is located with the vehicle 102) is determined from the received signals.

The signals can be transmitted over a number of different channel types or frequencies. For example, the signals may be transmitted on a plurality of control channels such as the RACH. Other examples of channels or channel types can also be used.

The signals can be transmitted over the channels in different ways. The signals can be transmitted periodically over different communication channels. For example, the signals can be transmitted at a first channel, then 200 ms later on a second channel, and so forth. Alternatively, the signals can be transmitted on the same channel periodically, e.g., every 200 ms. In still another approach, the signals may be transmitted on different channels at the same time or approximately the same time and this simultaneous (or nearly simultaneous) transmission may be made periodically, e.g., every 200 ms.

In other examples, the location determined by the external location determination device 110 is provided to at least one tracking device 114 located in the vicinity of the vehicle 102. The tracking device 114 can be any number of devices such as a camera located remotely from the vehicle and at least one sensing device at another vehicle. Other examples of tracking devices are possible.

In other examples, a security alert is transmitted to at least one security provider when jamming is detected. The security provider may be a private security company or the police to name two examples. The security alert can be transmitted from the communication and jamming detection device 104 to the security provider over any communication channel (e.g., the RACH) via any portion of the communication network the vehicle 102 is traversing (e.g., via the base station 106).

In another example, the vehicle 102 operates in a cellular network and the cellular network has a set re-use pattern for all channels, and particularly for the BCH control channel. These channels are typically not part of any frequency hopping scheme and, as such, are typically present on the network. Consequently, adjacent cell information is available to the communication and jamming detection device 104 represents a mapping of the control channels throughout the cellular network. In this case, transmissions can be made to all known control channels as the vehicle 102 moves through the cellular network. Additionally, measured RF power from signals received from the communication and jamming detection device 104 may be obtained. This information is used to track the vehicle 102 as it moves from cell to cell. The measured data could be from a single cell at a time or multiple cells simultaneously. If multiple cells are used, then the data could use triangulation approaches to determine the location of the vehicle 102.

Jamming can be determined in a variety of different ways. In some examples, as described in co-pending application entitled "Apparatus and Method for Detecting Jamming of Communications" filed on the same date as the present application and having Ser. No. 12/643,049, issued as U.S. Pat. No. 8,319,615, on Nov. 27, 2012, to Snider et al., a signal strength indicator is a numeric value that generally indicates the strength of a received signal in cellular communication systems. More specifically, the signal strength indicator is a value that indicates the magnitude of the signals that are transmitted and received within these systems.

A first rate of rise of a signal strength indicator associated with the first communication channel and a second rate of rise of a signal quality indicator associated with the first communication channel are monitored. The signal strength indicator may be a received signal strength indicator (e.g., Rx Level) and the signal quality indicators may be the RX quality level (e.g., Rx Qual). When at least one of the first rate rises at a rate greater than a first predetermined threshold rate and the second rate rises at a rate greater than a second predetermined threshold rate, jamming can be determined to exist.

Any number of antennas may be used by the communication device 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

In another aspect, once jamming is detected various actions can be taken that affect the operation of the vehicle and/or a driver's ability to successfully drive the vehicle 102. In these examples, it is assumed that the detection of jamming denotes an attempt to steal by a criminal to steal the vehicle 102 and/or its contents. Consequently, these approaches attempt to stop the theft of the vehicle 102 and/or its contents by adversely affecting the operation of the vehicle so that the criminal has a difficult or impossible time operating the vehicle 102. For example, the radio operation can be changed (e.g., by setting its sound level to a deafening level), the operation of the lights of the vehicle can be adjusted (e.g., by deactivating the lights at night), the operation of the horn can be altered (e.g., by activating the horn), the operation of the stability control system can be altered (e.g., to cause unstable operation), the seat location can be adjusted (e.g., by moving the seat to an uncomfortable position), the operation of heat controlled seats can be changed (e.g., by setting a temperature that is uncomfortable or scalding to a driver), the steering wheel operation can be altered (e.g., by locking the steering wheel), the temperature of the vehicle interior can be changed (e.g., by setting the temperature to an uncomfortable hot or cold setting), and/or the tone of an audible device can be altered (e.g., to produce a deafening tone) based upon the detection of jamming to thereby make theft of the vehicle and/or its contents difficult or impossible for the thief to achieve.

In still other examples, vehicle-to-vehicle coordination and tracking of stolen vehicles can be performed. More specifically, location data can be provided to other vehicles (e.g., vehicles with cameras or other sensors) in the area of the vehicle 102. This could enable authorities to use the cameras or other sensors in the other vehicles to collect more data. For example, a forward facing camera in a trailing car (to the vehicle 102) could be used to verify the license plate of the vehicle 102 and double check that the vehicle 102 is in fact the stolen vehicle. In another example, if for instance triangulation can not be used to determine the location of the vehicle 102, all vehicles in an area of the vehicle 102 (e.g., within a predetermined area that includes the last known location of the vehicle 102) could receive this indication and hunt for the stolen license plate (of the vehicle 102), reporting to the location determination device 110 their location if they find the stolen vehicle.

In another example, the location determination device 110 may alert other tracking devices (e.g., tracking devices located on buildings, on bridges, over roads, and so forth) to re-direct their cameras (or other sensors) to identify and track the vehicle 102. The information can be used to track the vehicle 102.

Figure 2:
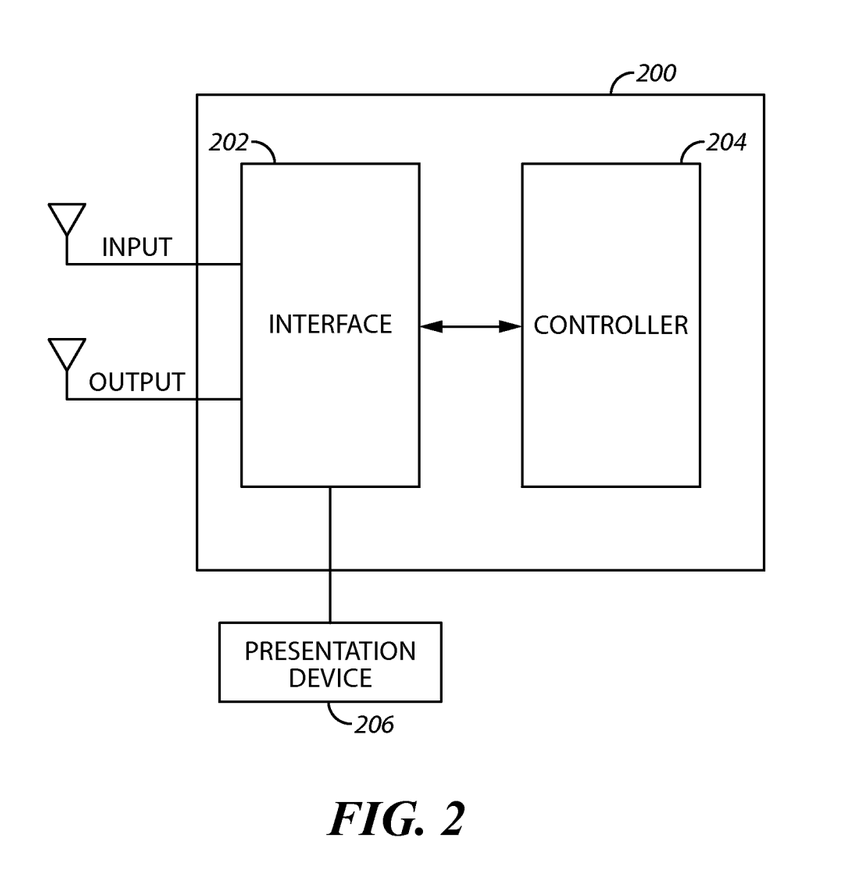
FIG. 2 comprises a block diagram of an apparatus that determines vehicle location after jamming occurs according to various embodiments of the present invention.

Referring now to FIG. 2, one example of an apparatus 200 (e.g., location determination apparatus 110 of FIG. 1) for determining the location of a vehicle in the presence of jamming is described. The apparatus 200 includes an interface 202 and a controller 204. The interface 202 includes an input and an output and is configured to receive an indication that jamming is occurring with communications being conducted between a communication and jamming detection device at the vehicle and a base station. The controller 204 is coupled to the interface 202 and configured to determine the location of the communication and jamming detection device from the indication and present the location at the output of the interface 202.

In some examples, the output of the interface 202 couples to a presentation device 206. The presentation device 206 may be any type of device that displays information and may include a visual display such as a video screen, a liquid crystal display, or one or more light emitting diodes to name a few examples. The presentation device 206 may also present audio information the user. Other examples of presentation devices are possible. The presentation device 206 may present the location of the vehicle in any number of ways. For example, the location of the vehicle may be provided on a map and the location of the vehicle may be updated in real time as the vehicle is tracked and its location moves. The absolute location (e.g., as measured in latitude or longitude coordinates) or location relative to some landmark or geographic feature (e.g., location on a particular road or within a city) as well as direction and speed of movement of the vehicle may also be provided.

The presentation device 206 may be located at a service provider (e.g., a security service provider that is subscribed to by the owner of the vehicle) or the police (e.g., at a police station or a police car). The appropriate security provider can watch the movement of the vehicle on the presentation device 206 in real time and assist in its recovery.

Figure 3:
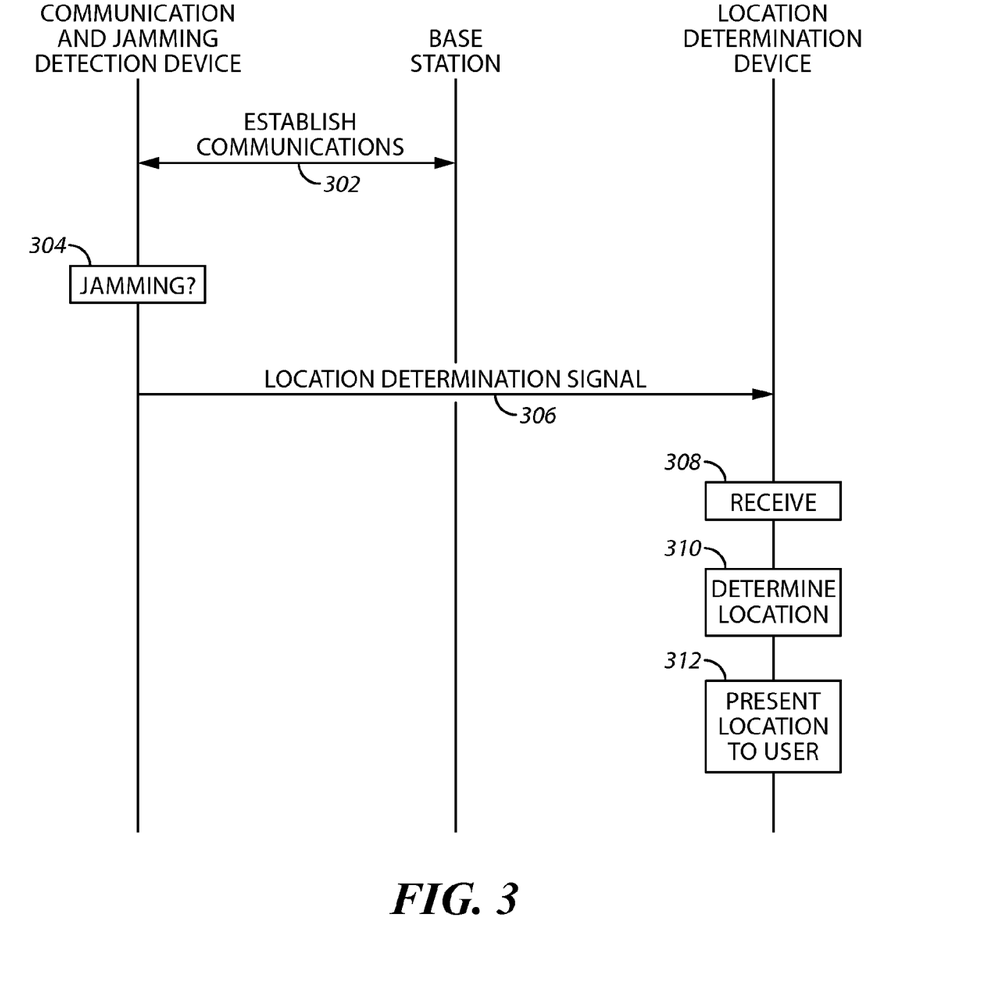
FIG. 3 comprises a flowchart of one example of an approach for determining vehicle location after jamming has occurred according to various embodiments of the present invention.

Referring now to FIG. 3, one example of an approach for determining a vehicle location when communications to the vehicle are being jammed is described. At step 302, communications are established and conducted between a communication and jamming detection device at the vehicle and a base station.

At step 304 and at the communication and jamming detection device, a determination is made as to when jamming of the communications between the communication and jamming detection device and the base station is occurring. As mentioned, the determination as to whether jamming occurring or is being attempted can be made by comparing signal strength indicators to predetermined thresholds to mention one example.

At step 306, when jamming is determined to be occurring, at least one location determination signal is transmitted from the communication and jamming detection device to at least one external location determination device. For example, this signal may be transmitted from one or more antennas from the device. Additionally, the transmission can be over a control channel (e.g., the RACH) that is not being jammed so that the transmissions will reach its intended destination.

At step 308 and at the at least one external location determination device, the location determination signals are received from the communication and jamming detection device. The external location determination device is disposed at a location geographically separate and apart from the vehicle (e.g., at a security provider service). The signals may be received over any communication network (e.g., the cellular communication network) or channel that communicates with the communication and jamming detection device.

At step 310, the location of the communication and jamming detection device at the vehicle is determined from the signals. For example, triangulation approaches may be used to determine vehicle location if the signals are received at three or more locations (e.g., base stations). In an alternative approach, the received power can be used to determine the location of the communication and jamming detection device. In still other examples, the approaches can be combined and used together to determine the location of the communication and jamming detection device (or refine a location already determined).

At step 312, the location may be presented to a user. The signals may be presented to a user (e.g., an authorized security agent from a private security service or the police) so that the user can determine the location of the vehicle. If the location determination signals are continuously being transmitted (i.e., these signals themselves are not being jammed) then the location of the vehicle may be tracked in real time.

Figure 4:
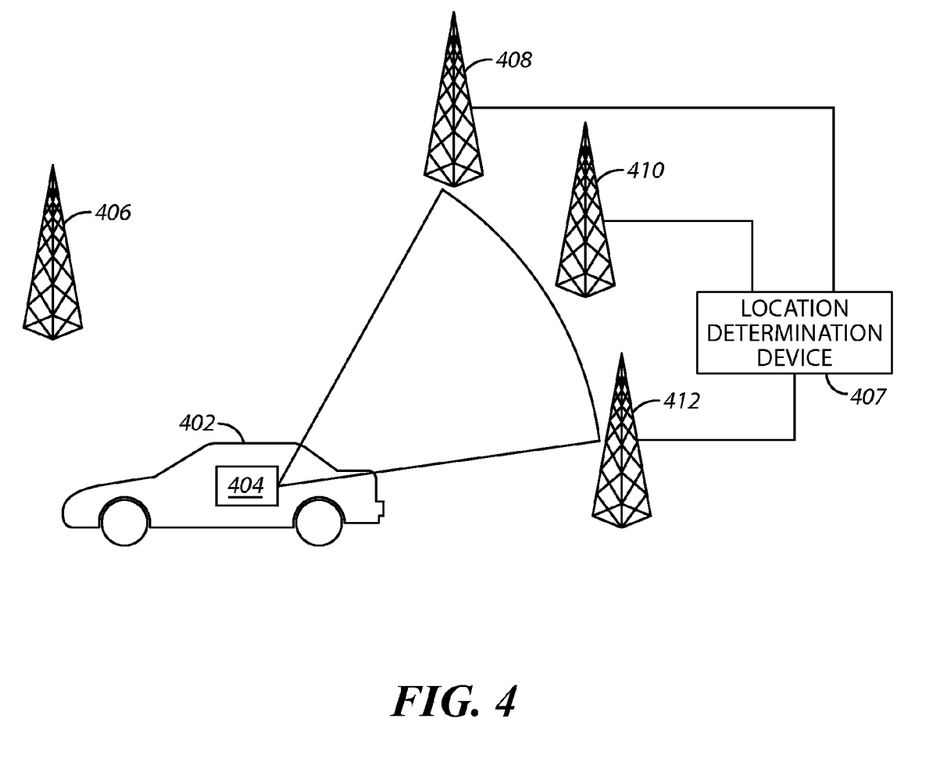
FIG. 4 comprises a block diagram of an approach using triangulation to determine vehicle location after jamming has been detected according to various embodiments of the present invention.

Referring now to FIG. 4, one example of using multiple sensors/location determination devices to determine vehicle location is described. A vehicle 402 includes a communication and jamming detection device 404. The communication and jamming detection device 402 detects the presence of jamming as has been described herein.

When the jamming (between the communication and jamming device 404 and a base station 406) is detected, the communication and jamming detection device 404 transmits a signal that is received at a first receiver 408 (e.g., a first antenna at a first base station), a second receiver 410 (e.g., a second antenna at a second base station) and a third receiver 412 (e.g., a third antenna at a third base station).

A location determination device 407 calculates the location of the communication and jamming detection device 404 by applying triangulation techniques to the signals received from the receivers 408, 410, and 412 as known in the art. More specifically, the receivers 408, 410 and 412, in one example and may sense the direction, time delay, power or other characteristic of a received signal in order to allow triangulation techniques to be used. In addition, rather than having a single location determination device 407, multiple devices may be used. These may be deployed at any place in or connected to the network.

Thus, approaches are provided where after jamming vehicle location is determined so that appropriate actions may be taken to recover the vehicle and/or its contents. The approaches described herein are easy to use, accurate in determining the occurrence of a jamming or attempted jamming, and cost effective to implement resulting in enhanced security for vehicles and their contents.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of tracking a location of a vehicle in a cellular communications network comprising a plurality of cells, a plurality of base stations at different geographic locations, at least one antenna at each base station, and a plurality of control channels, the method comprising:
   establishing and conducting through the cellular communication network, communications between a communication and jamming detection device located at the vehicle and a first base station for a first cell of the communication network;
   at the communication and jamming detection device:
   determining when jamming of the communications between the communication and jamming detection device and the base station is occurring;
   upon determining that jamming is occurring, transmitting a location determination signal from the communication and jamming device, on a plurality of different control channels for a plurality of different cells, such that the location determination signal is received by at least one external location determination device coupled to a second base station that is coupled to an antenna for a second cell, the external location determination device being configured to determine the location of the communication and jamming detection device by triangulation, the triangulation being responsive to reception of the location determination signal at a plurality different antennas for the plurality of different cells on the plurality of different control channels.

2. The method of claim 1 wherein the step of transmitting a location determination signal from the communication and jamming device, on a plurality of different control channels for a plurality of different cells comprises the step of transmitting the location determination signal on said plurality of different control channels at substantially the same time.

3. The method of claim 1 wherein step of transmitting a location determination signal from the communication and jamming device, on a plurality of different control channels for a plurality of different cells comprises the step of periodically transmitting the location determination signal on different control channels at different times.

4. The method of claim 1 wherein the power of a transmitted location determination signal measured at a point of reception is additionally used to determine the location of the communication and jamming detection device at the vehicle.

5. The method of claim 1 further comprising transmitting through the communication network, a security alert to at least one security provider when jamming is detected.

6. An apparatus for tracking a location of a vehicle using a cellular communications network, said cellular communications network comprising: a plurality of cells; a base station for each cell, the base stations being at different geographic locations; an antenna coupled to each base station; and additionally comprising a plurality of control channels; the vehicle comprising: a communication and jamming detection device configured to transmit a location determination signal on a plurality of different control channels, which when transmitted indicates that jamming of cellular communications between the communication and jamming detection device and a first base station for a first cell, is being attempted, the apparatus for tracking the location of a vehicle comprising:
   an interface having an input and an output, the interface input configured to receive a location determination signal from at least three base stations on the plurality of different control channels;
   a controller coupled to the interface and configured to determine the location of the communication and jamming detection device responsive to receipt of the location determination signal at the interface input, by triangulation of the received location determination signal on the plurality of different control channels by a plurality of different base stations.

7. The apparatus of claim 6 wherein the output of the interface couples to a presentation device.

8. The apparatus of claim 7 wherein the presentation device comprises a visual display selected from the group consisting of a video screen, a liquid crystal display, and one or more light emitting diodes.

9. The apparatus of claim 6 wherein the controller is further configured to transmit a security alert to at least one security provider when jamming is detected.

10. A method of tracking a location of a vehicle in a cellular communications network comprising a plurality of cells, a plurality of base stations at different geographic locations, at least one antenna at each base station, and a plurality of control channels, the vehicle comprising a communication and jamming detection device configured to be able to transmit a location determination signal on a plurality of different control channels, the method comprising:
   at a location determination device that is external to the vehicle and which is coupled to at least three base stations;
   receiving the location determination signal from a plurality of different base stations, each base station being coupled to a corresponding different antenna, each antenna being at a different location, each base station receiving the location determination signal on a different control channel;
   determining a location of the communication and jamming detection device responsive to the triangulation of its location from the reception of the location determination signal at the plurality of different base stations on different control channels.

11. The method of claim 10 wherein the location determination device determines the location of the communication and jamming detection device by triangulating a signal received at three locations.

12. The method of claim 10, further comprising the step of: transmitting a security alert to at least one security provider when the location determination signal is received by the location determination device.

* * * * *